Jan. 21, 1964 U. IWERKS 3,118,340
PANORAMIC MOTION PICTURE CAMERA ARRANGEMENT
Filed Aug. 26, 1960 2 Sheets-Sheet 1

INVENTOR.
UB IWERKS
Fulwider Mattingly &
Huntley
Attorneys

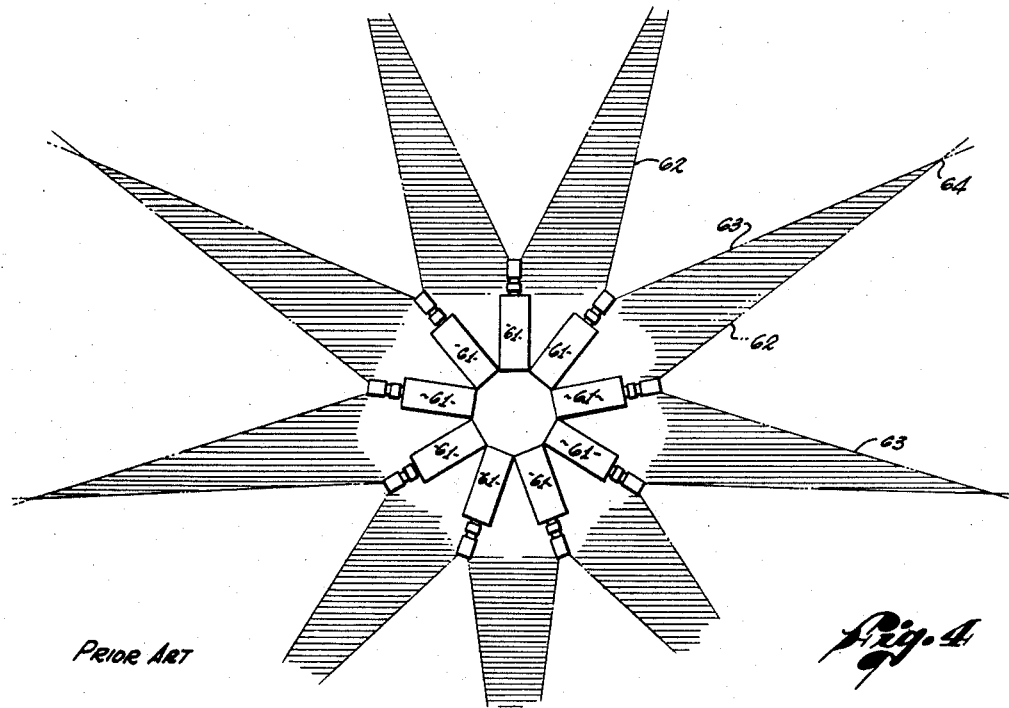
Fig. 4 PRIOR ART
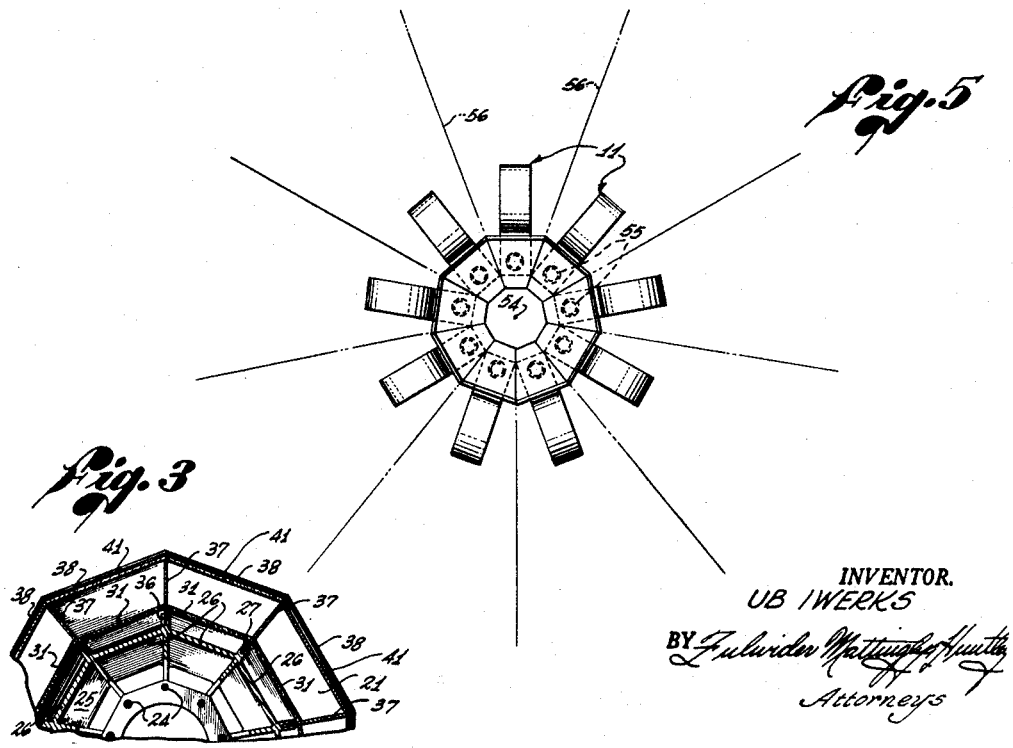
Fig. 5
Fig. 3
INVENTOR.
UB IWERKS
BY Fulwider Mattingly Huntley
Attorneys

United States Patent Office 3,118,340
Patented Jan. 21, 1964

3,118,340
PANORAMIC MOTION PICTURE CAMERA
ARRANGEMENT
Ub Iwerks, Sherman Oaks, Calif., assignor to Walt Disney Productions, Burbank, Calif., a corporation of California
Filed Aug. 26, 1960, Ser. No. 47,709
8 Claims. (Cl. 88—16.6)

The present invention relates generally to motion picture camera arrangements and more particularly to a multiple motion picture camera assembly for simultaneously photographing a plurality of adjacent and continuous photographic fields.

It has been heretofore proposed to provide a continuous motion picture covering a circular field of 360°, or any part thereof, in which a plurality of screens are arranged in side by side relation in a circle or a part thereof and upon which adjacent scenes or viewing areas are projected in mosaic pattern to form an extended continuous picture. The individual scenes projected on the individual screens are photographed by individual cameras arranged in an assembly, equi-distantly spaced from each other, with their optical axes extending radially outward. Because of the spacing between the adjacent camera lenses the fields photographed thereby do not match one another, there being gaps between the photographic fields adjacent to the cameras and an overlapping of the fields in the areas remote from the cameras.

It is an object of the present invention to provide a novel multiple motion picture camera assembly for simultaneously photographing adjacent and continuous scenes wherein the individual photographic fields are substantially matched in side by side relation so that a multiple projection of the images produced therefrom will give a substantially continuous picture.

Another object of the invention is a novel multiple motion picture camera assembly for photographing a complete or partial circular picture, in which individual cameras simultaneously photograph sectors of the field, with the lines defining the boundaries of the sectors being substantially radial and having their projectings meeting at substantially a common point.

A further object of the invention is a novel multiple motion picture camera assembly for simultaneously photographing individual sectors of a circular field, with the edges of the sectors substantially mating in side by side relation throughout their length to produce a substantially continuous circular photographic field.

Yet another object of the invention is a novel multiple motion picture camera assembly for simultaneously photographing a circular field, in which the lenses of all the cameras are optically placed substantially in the center of the circular field.

Other objects and features of the invention will be readily apparent to those skilled in the art from the following specification and annexed drawings in which:

FIGURE 3 is a partial sectional view on the line 3—3 of FIGURE 1;

FIGURE 4 is a diagrammatic representation of the photographic fields of prior art camera assemblies; and FIGURE 5 is a diagrammatic representation of the photographic fields of the multiple camera assembly of the present invention.

Figure 1:
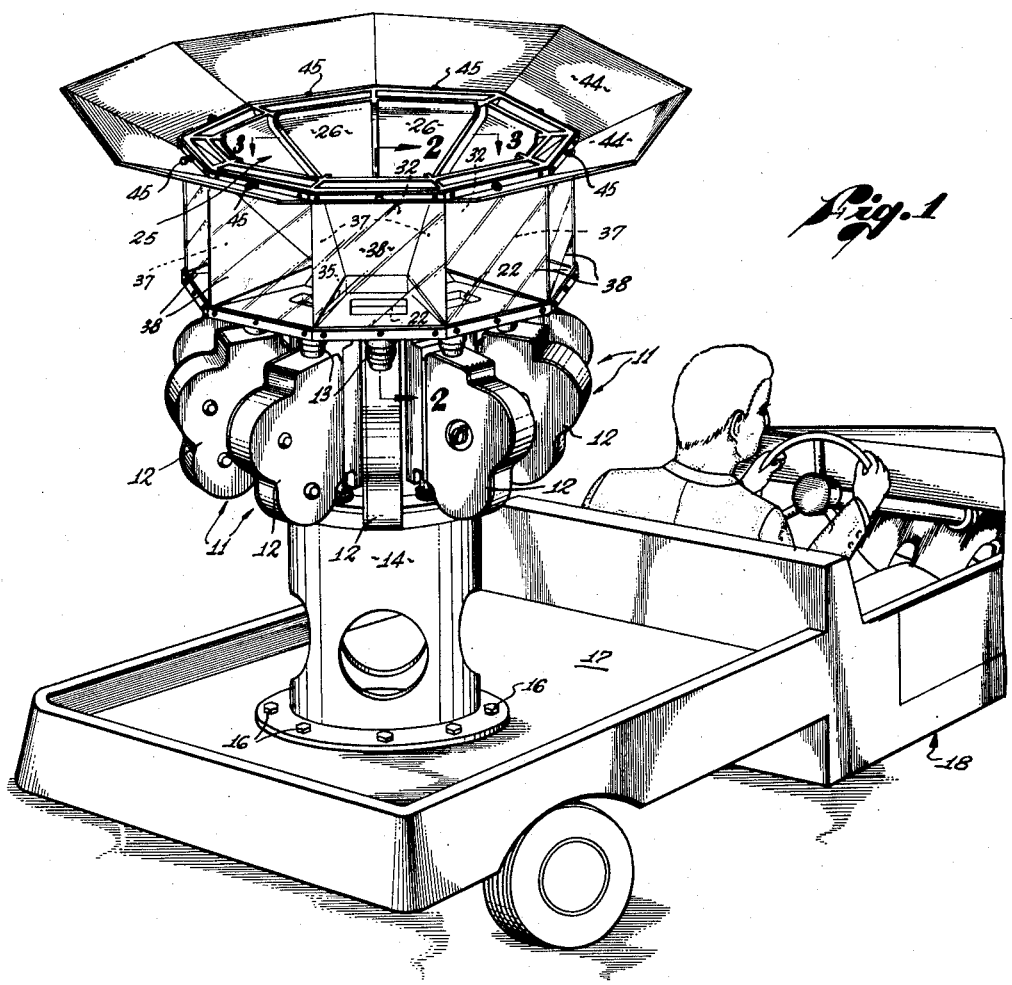
FIGURE 1 is a perspective view of a motion picture camera assembly embodying the present invention, shown on a mobile mount.

Referring to FIGURES 1-3 and 5 of the drawings, there is shown a plurality of conventional motion picture cameras 11 having main body portions 12 and lens holders 13. The cameras 11 are mounted with their optical axes vertical and equi-distantly spaced about the upper surface of a vertically disposed, cylindrical support 14 and are supported in any desired manner, for example by studs 15 shown in FIGURE 2. Th cylindrical support 14 is bolted at 16 to the bed 17 of a vehicle 18, shown as a self propelled automotive vehicle although it will be understood that the camera assembly may readily be carried by other types of conveyances such as boats, aircrafts, trains, and the like.

Figure 2:
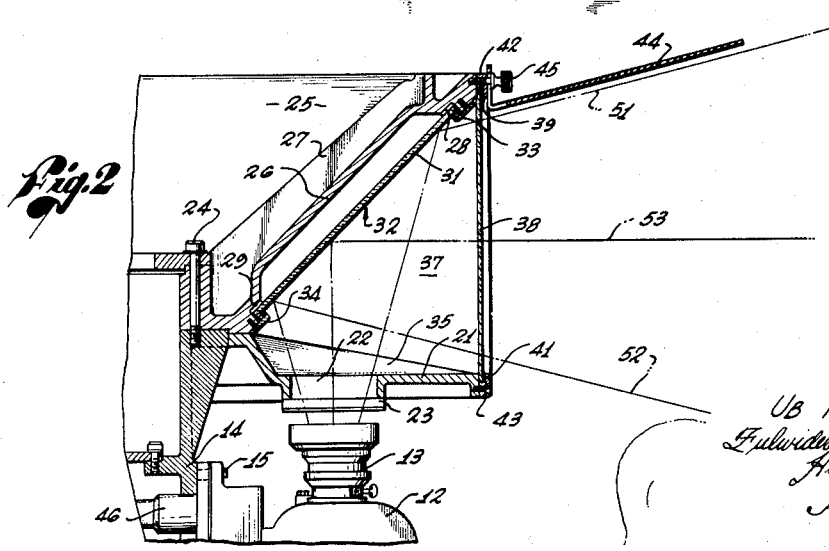
FIGURE 2 is an enlarged partial sectional view on the line 2—2 of FIGURE 1.

Integrally mounted at the upper end of the support 14 is a horizontal annulus 21 disposed above the cameras 11 and having substantially square apertures 22 therethrough immediately above the lens holders 13, closed by transparent plates 23, through which the light rays may pass to the camera lenses. Upon the top of the support 14 and above the annulus 21 is mounted, by bolts 24, an inverted frusto-conical support 25 having a plurality of flat, inclined walls or sides 26 separated by ribs 27. Adjacent to the top and bottom of the walls 26 are disposed seats 28 and 29 against which are mounted mirrors 31 inclined to the horizontal and vertical at a substantially 45° angle, as shown in FIGURE 2. The mirrors 31 have outwardly facing silvered surfaces 32 and are clamped against suitable gaskets in the seats 28 and 29 by clamping strips 33 and 34, bolted to the support 25 adjacent to the top and bottom of the sides or walls 26.

The annulus 21 is provided with multiple ribs 35 which align with the ribs 27 on the support 25. These ribs are provided with slots 36, FIGURE 3, in which are supported thin, opaque, partition plates 37 extending between the edges of the mirrors 31 and serving to cut off undesired or stray rays of light from the side. In front of each of the mirrors 31 is disposed a transparent sealing plate 38 of glass or plastic material, the transparent plates 38 being mounted against the front edges of the annulus 21 and the support 25 in gasketed recesses 39 and 41 by mounting strips 42 and 43 respectively. To intercept undesired light rays which might pass through the transparent plates 38 from above and enter the lens apertures, the assembly is provided with opaque shielding plates 44 mounted on the support 25 as by thumb screws 45. The plates 44 are shown more particularly in FIGURES 1 and 2 as disposed at a small angle to the horizontal and with mating edges. It will be understood that similar opaque shields may be used at the bottom of the plates 38 to intercept undesired light rays which might strike the plates from below and that the shielding plates 37 may also be extended outwardly to intercept light rays which might engage the plates 38 from the side.

All of the cameras 11 will be operated simultaneously and in synchronism to photograph the entire circular field surrounding the assembly. The synchronizing mechanism forms no part of this invention but a mechanical drive shaft for this purpose is indicated at 46 in FIGURE 2.

The light rays from the scene to be photographed by each individual camera are indicated by the broken lines in FIGURE 2, the upper extreme at 51, the lower extreme at 52 and the medium line at 53. These light rays pass through the transparent plate 38 to the silvered surface 32 of the mirror 31 and are reflected downwardly, as indicated, into the camera lens. The vertical distance along the optical axis of each camera between its lens and its associated mirror is made the same as the horizontal distance between its optical axis and the center of the circle in which the cameras are assembled. Therefore, the optical effect of photographing each of the mirror images is to put all of the camera lenses in optical coincidence at the center of the circular field being photographed, this point being indicated at 54 in FIGURE 5. Thus, in FIGURE 5, the camera lenses are physically indicated at 55, spaced equi-distant about a circle surrounding the center point 54, while their photographing of the reflected mirror image optically places the camera lenses in coincidence at the point 54. The effect of this optical coincidence of the camera lenses is to mate the lines 56 which define the side limits of the sector fields photographed by each of the cameras. This mating of the sector limits avoids gaps between the camera fields and/or overlapping thereof as occurred with prior art assemblies of multiple cameras for circular photography.

The advantages of the invention will be more particularly appreciated from a consideration of the prior art arrangement of FIGURE 4 wherein cameras 61 are equidistantly spaced from one another about a circle, with their optical axes extending radially outwardly. The photographic fields for each camera are indicated by the horizontal limiting lines 62 and 63. With this arrangement, it is seen that between the limit 62 of one camera field and the limit 63 of the adjacent camera field there is a gap represented by the shaded portion which is not covered by either camera so that subjects therein will not be photographed and will not, of course, appear on the projected image produced from the photograph. Similarly, it will be seen that the adjacent field limits converge and outwardly of the points 64 the fields will overlap and produce a double image of the subject.

Both the gaps between the individual camera fields and the overlapping of the fields are avoided in the multiple camera assembly of the invention by having the camera lenses in optical coincidence in the center of the circular field, producing thereby coincidence of the edges of the photographic fields of the individual cameras, which fields are each true sectors of the complete circular scene. This is illustrated in FIGURE 5 wherein the lines 56 defining the photographic field of each camera are in substantial coincidence with the lines 56 defining the photographic fields of the adjacent cameras.

While nine cameras are shown in the accompanying drawings, a greater or lesser number may be employed depending on the angular width of each sector of photographic field. To secure projection of a circular picture with minimum distortion it will ordinarily be desired to utilize an odd number of projections and, correspondingly, an odd number of cameras will ordinarily be used.

While a certain preferred embodiment of the invention has been specifically shown and described in accordance with the patent statutes, it is understood that the invention is not limited thereto as many variations will be apparent to those skilled in the art and the invention is to be given its broadest interpretation within the terms of the following claims.

I claim:

1. A motion picture camera assembly for photographing a circular scene comprising: a support; a plurality of motion picture cameras mounted on said support and spaced equi-distant about a horizontal circle with their optical axes substantially vertical; a substantially annular platform mounted on said support above said cameras and having apertures therethrough in alignment with said optical axes; a second support of substantially inverted frusto-conical shape mounted on said first support above said platform; a plurality of reflecting surfaces, one for each of said cameras, disposed at a substantially 45° angle to the horizontal in line with said optical axes to render them effectively horizontal and projecting radially outwardly, said surfaces having their edges immediately adjacent and themselves forming an inverted frusto-conical configuration; and transparent sealing plates in front of said reflecting surfaces and extending between the edges of said platform and said second support, the distance along the optical axes from the camera lenses to the reflecting surfaces being substantially equal to the horizontal distance from the optical axes to the center of the circle whereby the camera lenses are placed in substantial optical coincidence at the center of said circle.

2. A motion picture camera assembly for photographing a panoramic scene comprising:
   a support;
   a plurality of motion picture cameras mounted on said support, said cameras being spaced equi-distant about a substantially horizontal circle and with their optical axes substantially vertical;
   a reflecting surface for each of said cameras mounted on said support at substantially a 45° angle to the horizontal and vertical so as to render the optical axes of said cameras effectively horizontal and projecting radially outwardly, the edges of each reflecting surface being immediately adjacent the edges of its neighboring surfaces, the distance along the optical axes from the camera lenses to the associated reflecting surface being substantially equal to the horizontal radial distance from the optical axes to the center of the circle so as to place said camera lenses in substantial optical coincidence at the center of said circle whereby each camera photographs substantially a true sector field with the sides thereof in substantial coincidence to avoid gaps between the individual camera fields;
   and a plurality of vertical light shields on said support, said shields being interposed between the side edges of said reflecting surfaces to intercept undesired light rays from striking said reflecting surfaces from the side.

3. An assembly as set forth in claim 2 wherein an opaque shielding plate extends radially outwardly from said support above each of said reflecting surfaces to intercept undesired light rays from striking said reflecting surfaces from above.

4. An assembly as set forth in claim 3 wherein a transparent sealing plate is disposed in front of each of said reflecting surfaces.

5. A motion picture camera assembly for photographing a panoramic scene comprising:
   a support;
   a plurality of motion picture cameras mounted on said support, said cameras being spaced equi-distant about a substantially horizontal circle and with their optical axes disposed in a vertical plane;
   a reflecting surface for each of said cameras disposed at an angle relative to the optical axes of each respective camera so as to render said optical axes effectively horizontal and projecting radially outwardly, the edges of each reflecting surface being immediately adjacent the edges of its neighboring surfaces, the distance along the optical axes from the camera lenses to the associated reflecting surface being substantially equal to the horizontal radial distance from the optical axes to the center of the circle so as to place said camera lenses in substantial optical coincidence at the center of said circle whereby each camera photographs substantially a true sector field with the sides thereof in substantial coincidence to avoid gaps between the individual camera fields;
   and a plurality of vertical light shields on said support, said shields being interposed between the side edges of said reflecting surfaces to intercept undesired light rays from striking said reflecting surfaces from the side.

6. An assembly as set forth in claim 5 wherein an opaque shielding plate extends radially outwardly from said support above each of said reflecting surfaces to intercept undesired light rays from striking said reflecting surfaces from above.

7. An assembly as set forth in claim 6 wherein a transparent sealing plate is disposed in front of each of said reflecting surfaces.

8. A motion picture camera assembly for photographing a panoramic scene comprising:
   a support;

a plurality of motion picture cameras mounted on said support, said cameras being spaced equi-distant about a substantially horizontal circle and with their optical axes substantially vertical; and a reflecting surface for each of said cameras mounted on said support at substantially a 45° angle to the horizontal and vertical so as to render the optical axes of said cameras effectively horizontal and projecting radially outwardly, the edges of each reflecting surface being immediately adjacent the edges of its neighboring surfaces, the distance along the optical axes from the camera lenses to the associated reflecting surface being substantially equal to the horizontal radial distance from the optical axes to the center of the circle so as to place said camera lenses in substantial optical coincidence at the center of said circle whereby each camera photographs substantially a true sector field with the sides thereof in substantial coincidence to avoid gaps between the individual camera fields.

References Cited in the file of this patent

UNITED STATES PATENTS

| | | |
|---|---|---|
| 649,046 | Fiske | May 8, 1900 |
| 1,735,109 | Eliel | Nov. 12, 1929 |
| 1,797,849 | Aschenbrenner | Mar. 24, 1931 |
| 2,794,379 | McNeil | June 4, 1957 |
| 2,927,508 | Hoch | Mar. 8, 1960 |
| 2,928,313 | Hattori | Mar. 15, 1960 |
| 2,942,516 | Disney et al. | June 28, 1960 |

FOREIGN PATENTS

| | | |
|---|---|---|
| 385,423 | France | May 12, 1908 |
| 1,016,033 | Germany | Sept. 19, 1957 |